G. L. SCHOFIELD.
AUXILIARY CONTROL FOR MOTOR VEHICLES.
APPLICATION FILED NOV. 28, 1919.
1,420,290.
Patented June 20, 1922.
Fig I
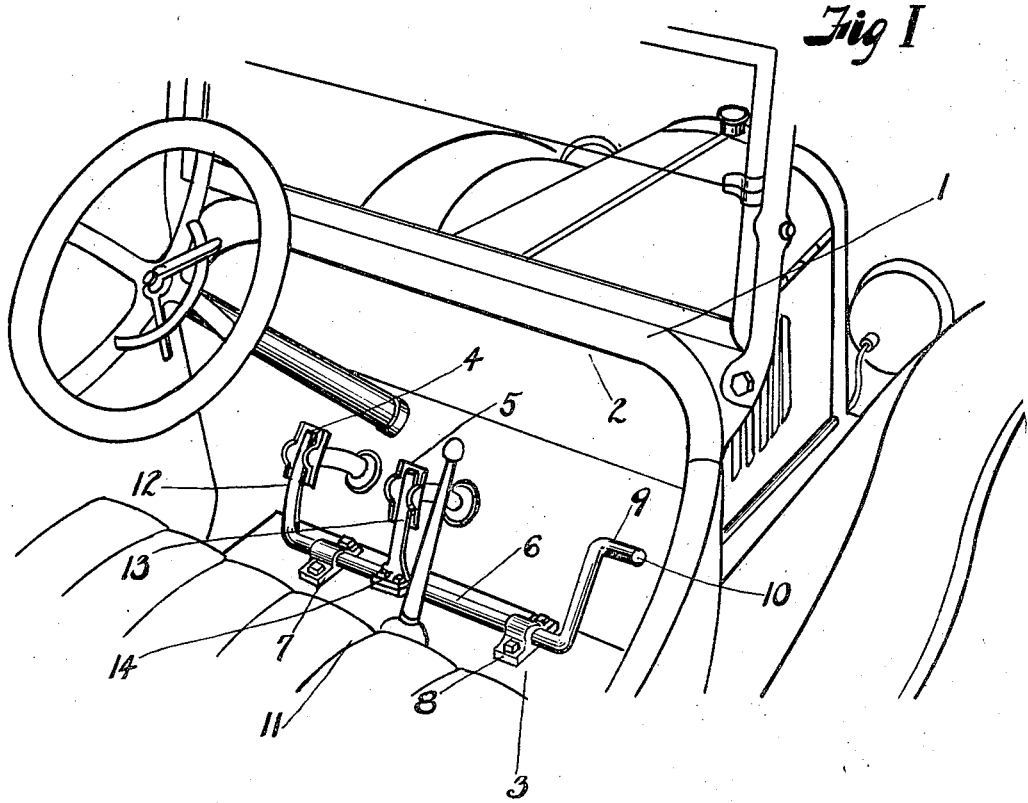
Fig II
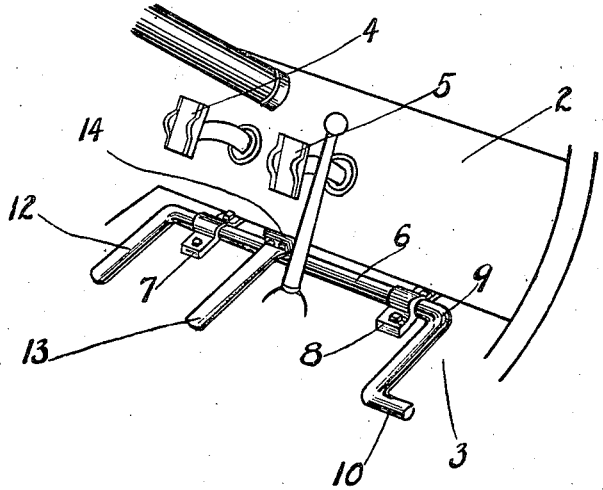
INVENTOR
George L. Schofield
BY
Arthur C. Brown
ATTORNEY

UNITED STATES PATENT OFFICE.

GEORGE L. SCHOFIELD, OF KANSAS CITY, MISSOURI.

AUXILIARY CONTROL FOR MOTOR VEHICLE.

1,420,290.  Specification of Letters Patent.  Patented June 20, 1922.

Application filed November 28, 1919. Serial No. 341,199.

*To all whom it may concern:*

Be it known that I, GEORGE L. SCHOFIELD, a citizen of the United States, residing at Kansas City, in the county of Jackson and State of Missouri, have invented certain new and useful Improvements in Auxiliary Controls for Motor Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an auxiliary motor vehicle control adapted to be applied as an attachment whereby the driving mechanism of the motor vehicle may be under the control of either of two persons so that a dual control is provided and it is also the object of my invention to provide means whereby certain parts of the driving mechanism may be controlled from a point distant from the usual foot levers, this being important where the motor vehicle is being temporarily used as the power unit of a tractor and where the steering wheel for the tractor is on the right hand side of the vehicle and the steering wheel for the motor vehicle is on the left hand side of the vehicle.

In the type of tractors which I particularly have in mind, the motor vehicle is jacked up on a tractor frame and the power transmission for the motor vehicle is mechanically connected to a driving axle on the tractor frame. The tractor frame is provided with a steering wheel usually outside of the motor vehicle and generally to the right hand side of the dash. In order to steer the tractor, the operator must sit on the right hand side of the seat or away from the steering wheel of the motor vehicle and this position makes it inconvenient to operate the clutch lever and foot lever for the brake.

According to my invention, however, these levers or any other complementary levers may be operated from the right hand side of the motor vehicle without deranging any of the parts of the motor vehicle.

The invention is also applicable for a dual control as, for example, when an instructor is teaching the art of driving motor vehicles, since the instructor may sit beside the student and avoid accidents by operating the clutch and brake levers without interferring with the student.

Another important feature of the invention is that it may be readily attached to a car, moved into and out of operative position in an expeditious and convenient manner, and without deranging any of the parts.

In the drawings,

Fig. I is a perspective view of the inside of the dash and adjacent floor of a motor vehicle, showing my invention applied, and Fig. II is a similar view, showing the device moved into inoperative position.

Referring now to the drawings by numerals of reference:

1 designates a conventional type of motor vehicle, provided with the usual dash 2 and floor 3, the clutch pedal 4 and brake pedal 5. My invention contemplates an actuator adapted to move the brake pedal into brake applying position and the clutch pedal into clutch releasing position, and a simple embodiment thereof is illustrated as comprising a rock shaft 6, rotatably secured in the bearings 7 and 8 on the floor 3, and said rock shaft is shown as provided with a crank 9 on the right hand end, the crank 9 carrying a pedal 10 for the foot of an operator sitting on the right hand side of the seat 11. The other end of the shaft 6 is provided with a crank or finger 12 to exert pressure against the clutch pedal 4, and in line with the brake pedal 5 is a crank or finger 13, preferably attached to the rock shaft 6 by a split connector 14, whereby it may be adjusted on said shaft or entirely removed therefrom, as found convenient.

When the parts are in the position as shown and the operator is driving a tractor, the cranks 12 and 13 will rest against the clutch and brake pedals respectively. Therefore, when it is necessary to operate the clutch and brake, the operator will press against the pedal 10, causing the fingers 12 and 13 to operate the clutch pedal 4 to throw out the clutch and the brake pedal 5 to apply the brake. When pressure is relieved on the pedal 10, the pedals 4 and 5 will be restored to their normal position in the usual manner.

When the car 1 is being driven as a pleasure vehicle, or, in other words, detached from the tractor frame, the cranks 9, 12 and 13 may be swung over to assume positions on the floor 3, whereupon the pedals 4 and 5 may be operated in the usual manner by the driver sitting behind the steering wheel 15. If, however, it is desired to use the device in giving instructions in the art of driving a motor vehicle, the device may be swung up to the position as shown in Fig. I and the student may be left supposedly free to manipulate the vehicle, but in the event that there is danger of a collision or the like, the instructor may quickly press against the pedal 10 to throw out the clutch and apply the brake independently of any action by the student, although the application ot pressure to the pedal 10 will in no way interfere with the student's applying pressure to the pedals 4 and 5.

It will, therefore, be apparent that the attachment may be readily applied to a motor vehicle without interfering with the normal operation of the parts or without deranging any of them and that the clutch and brake may be readily operated from one side of the vehicle as conveniently as from the other.

It will also be apparent that the controller may be swung about the axis of the shaft 6 (through the medium of the pedal 10 serving as a handle) so that all the members 9, 12 and 13 rest upon the floor of the vehicle out of operative position but conveniently accessible to be swung into operative position when required.

What I claim and desire to secure by Letters-Patent is:

An auxiliary motor vehicle controller comprising a rock shaft, levers mounted on the rock shaft for engaging the faces of the control pedals of a motor vehicle and a foot lever at the end of the rock shaft for actuating said shaft.

In testimony whereof I affix my signature.

GEORGE L. SCHOFIELD.